United States Patent [19]

Riemer et al.

[11] Patent Number: 5,662,184
[45] Date of Patent: Sep. 2, 1997

[54] ARRANGEMENT OF A DRIVE UNIT IN AN ELECTRIC VEHICLE

[75] Inventors: Bernd Riemer, Stuttgart; Thomas Klaiber, Weinstadt, both of Germany

[73] Assignee: Daimler-Benz AG, Germany

[21] Appl. No.: 420,600

[22] Filed: Apr. 12, 1995

[30] Foreign Application Priority Data

Apr. 12, 1994 [DE] Germany ............... 44 12 451.1

[51] Int. Cl.$^6$ ........................................... B60K 11/04
[52] U.S. Cl. .............................. 180/65.1; 180/68.4
[58] Field of Search ......................... 180/65.1, 65.3, 180/65.6, 65.7, 65.8, 68.4

[56] References Cited

U.S. PATENT DOCUMENTS

| | | | |
|---|---|---|---|
| 4,081,693 | 3/1978 | Stone | 307/66 |
| 5,193,635 | 3/1993 | Mizuno et al. | 180/65.3 |
| 5,248,566 | 9/1993 | Kumar et al. | 429/19 |
| 5,409,784 | 4/1995 | Bromberg et al. | 180/65.3 |

FOREIGN PATENT DOCUMENTS

| | | |
|---|---|---|
| 667 335 | 11/1938 | Germany. |
| 1 406 988 | 10/1968 | Germany. |
| 25 58 456A1 | 6/1977 | Germany. |
| 94/05047 | 3/1994 | WIPO. |

OTHER PUBLICATIONS

"Solid Polymer Fuel Cell Develoments at Ballard," K.B. Prater, 6040 Journal of Power Sources, 37 (1992) Jan., Nos. 1/2, pp. 181–188.

European Search Report dated Aug. 1, 1995.

"Alkohol–Luft–Brennstoffzellen als Langzeit–Energiequellen," A. Beiträge, Brown Boveri Mitteilungen, Jan./Feb. 1966, pp. 5–17.

Primary Examiner—Brian L. Johnson
Assistant Examiner—Frank Vanaman
Attorney, Agent, or Firm—Evenson, McKeown, Edwards & Lenahan P.L.L.C.

[57] ABSTRACT

An arrangement of a drive unit in a vehicle, which drive unit comprises at least an electric traction motor, a fuel cell, a compressor for supplying air to the fuel cell and an electric motor for driving the compressor. According to the invention, the fuel cell is partitioned into at least two fuel-cell stacks which are fitted on opposite sides of the compressor. The electric motor, the compressor and a radiator fan are arranged on a common drive shaft.

2 Claims, 2 Drawing Sheets

ARRANGEMENT OF A DRIVE UNIT IN AN ELECTRIC VEHICLE

BACKGROUND AND SUMMARY OF THE INVENTION

The invention relates to an arrangement of a drive unit in an electric vehicle.

U.S. Pat. No. 5,193,635 discloses a vehicle with a fuel-cell system and an electric traction motor, in which the entire fuel-cell system, comprising a reformer, the fuel-cell stack and two compressors, is mounted on a common frame and fitted in the region of the centre of gravity of the vehicle.

In conventional vehicles, however, the passenger compartment is situated in the region of the centre of gravity of the vehicle, so that it is not possible to fit a complete fuel-cell system in this position without an appreciable adverse affect on the space available for the occupants.

The object of the present invention is to provide an arrangement for a drive unit in a vehicle, such that a fuel-cell system can be fitted in a conventional vehicle without adversely affecting the passenger compartment, while reducing the constructional space required and with simultaneous reduction of the air conveyance path.

According to the invention, the object is achieved by the arrangement of a compact system of fuel-cell stack and compressor in the front section of a vehicle. Such an arrangement has the advantages that the passenger compartment is not adversely affected and that the constructional space required is reduced. The constructional space can be reduced further by arrangement of the radiator fan, the compressor and an electric motor on a common drive shaft. In addition, the radiator can be left at the known installation position. Finally, the partitioning of the fuel cell over two stacks fitted on opposite sides of the centrally situated compressor ensures a short air duct from the air filter via the compressor to the cell stacks.

Other objects, advantages and novel features of the present invention will become apparent from the following detailed description of the invention when considered in conjunction with the accompanying drawings.

DETAILED DESCRIPTION OF THE DRAWINGS

Figure 1A:
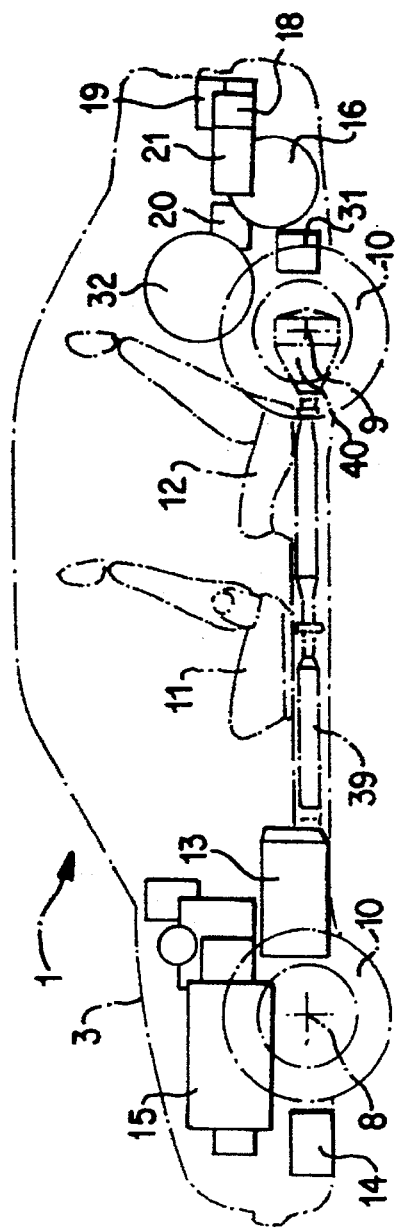
FIG. 1a shows a basic diagram of a vehicle construction according to the invention, in a vertical longitudinal section.
Figure 1B:
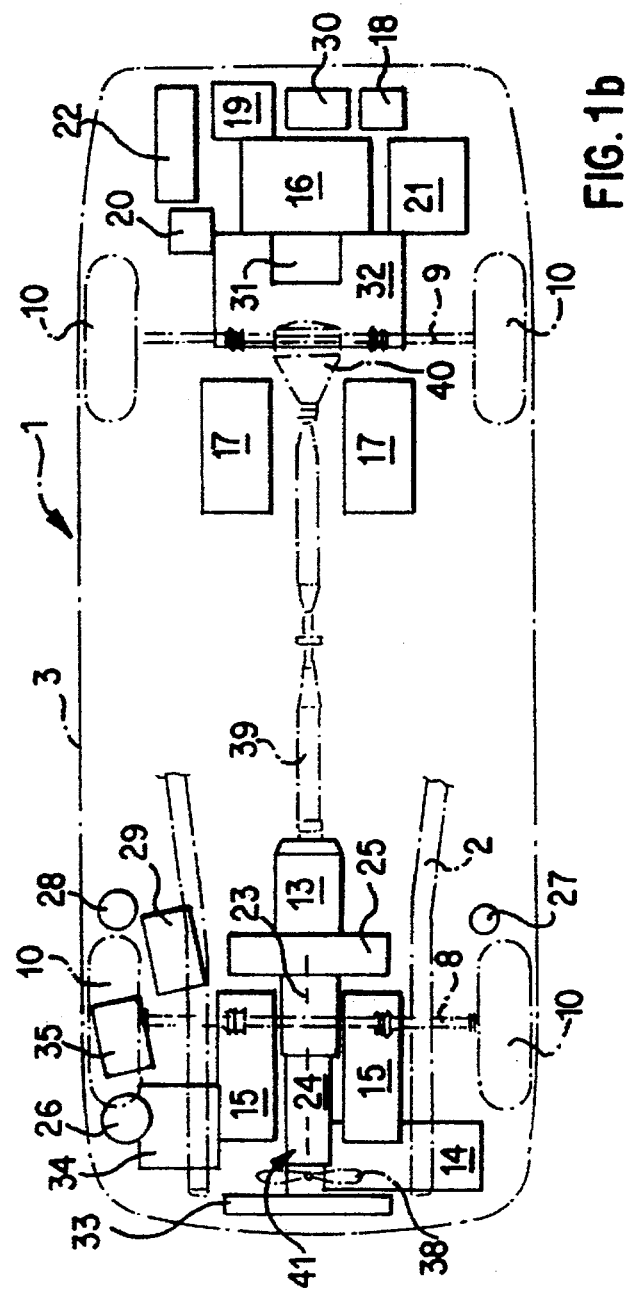
FIG. 1b shows the arrangement in FIG. 1a in a horizontal section.

The vehicle in FIG. 1, denoted as a whole by 1, has a body 3 supported by a vehicle frame 2. Rotatably attached to the vehicle frame 2 are a front axle 8 and a rear axle 9, to which two wheels 10 are fitted in each case. In addition, two front seats 11 and a rear bench seat 12 are supported by the vehicle frame 2. To drive the vehicle, an electric traction motor 13, whose power can be modified with the aid of a current controller 14, is fitted in the region behind the front axle 8. The electric traction motor 13 is interlocked with a fixed-transmission-ratio gearbox or a two-gear automatic gearbox and is fitted along the longitudinal axis of the vehicle, the vehicle being driven with the aid of a propeller shaft 39 and a differential 40 by means of the rear axle 9. Obviously, however, other drive designs are also possible, for example by means of two electric motors fitted near the wheels on the rear axle 9.

Electrical power for the electric traction motor 13 is generated with the aid of a fuel-cell system. The fuel-cell system comprises fuel-cell stacks 15, in which a multiplicity of individual fuel cells is incorporated, a reformer 16, fuel tanks 17 and a multiplicity of auxiliary units 18–35. The operation of the fuel-cell system, for example a PEM fuel cell with methanol reformer, is generally known and is therefore only briefly described below.

Methanol stored in the fuel tank 17 and water from a water reservoir 18 are converted to a gaseous state in a vaporizer 19 and then fed to the reformer 16, in which essentially hydrogen, carbon dioxide and carbon monoxide are formed from the methanol/water-vapour mixture with heat being supplied with the aid of a catalytic burner 20. To reduce the carbon monoxide component, a CO oxidizer 21 may additionally be provided. This $H_2$-containing fuel gas is then fed under pressure to the fuel-cell stack 15 with the aid of an $H_2$ compressor 22. Moistened air is additionally fed under pressure to the fuel-cell stack by means of a further compressor 23 with associated electric motor 24. The fuel cell uses the hydrogen and oxygen according to a process well known to those skilled in the art, to generate electrical power, which is fed to the electric traction motor 13 via the current controller 14 to drive the vehicle 1. A multiplicity of further auxiliary units, for example ion exchanger 25, air filter 26, condensate trap 27, equalization reservoir 28, water pump 29, reformate condenser 30, reformer heat exchanger 31, hydrogen temporary reservoir 32, fuel-cell radiator 33, and current controller 34 for electrical auxiliary components or moistener 35 may also be necessary to operate the fuel-cell system. The operation of these auxiliary units is well known, and is therefore not described further.

In order to accommodate such a multiplicity of components in a vehicle, it is advantageous if the units are designed as separate components, which can consequently be distributed over the available installation positions. Because in this arrangement, no space is available for the arrangement of drive units in the central region of the vehicle, these components are distributed over the front and the rear region of the vehicle. The fuel tank 17 is partitioned into two parts and arranged under the rear bench-seat 12. The hydrogen temporary reservoir 32 is additionally fitted in the rear section of the vehicle immediately behind the rear bench-seat 12. The reformer 16 and associated auxiliary units remain fitted in the lower region of the rear region of the vehicle.

Figure 1C:
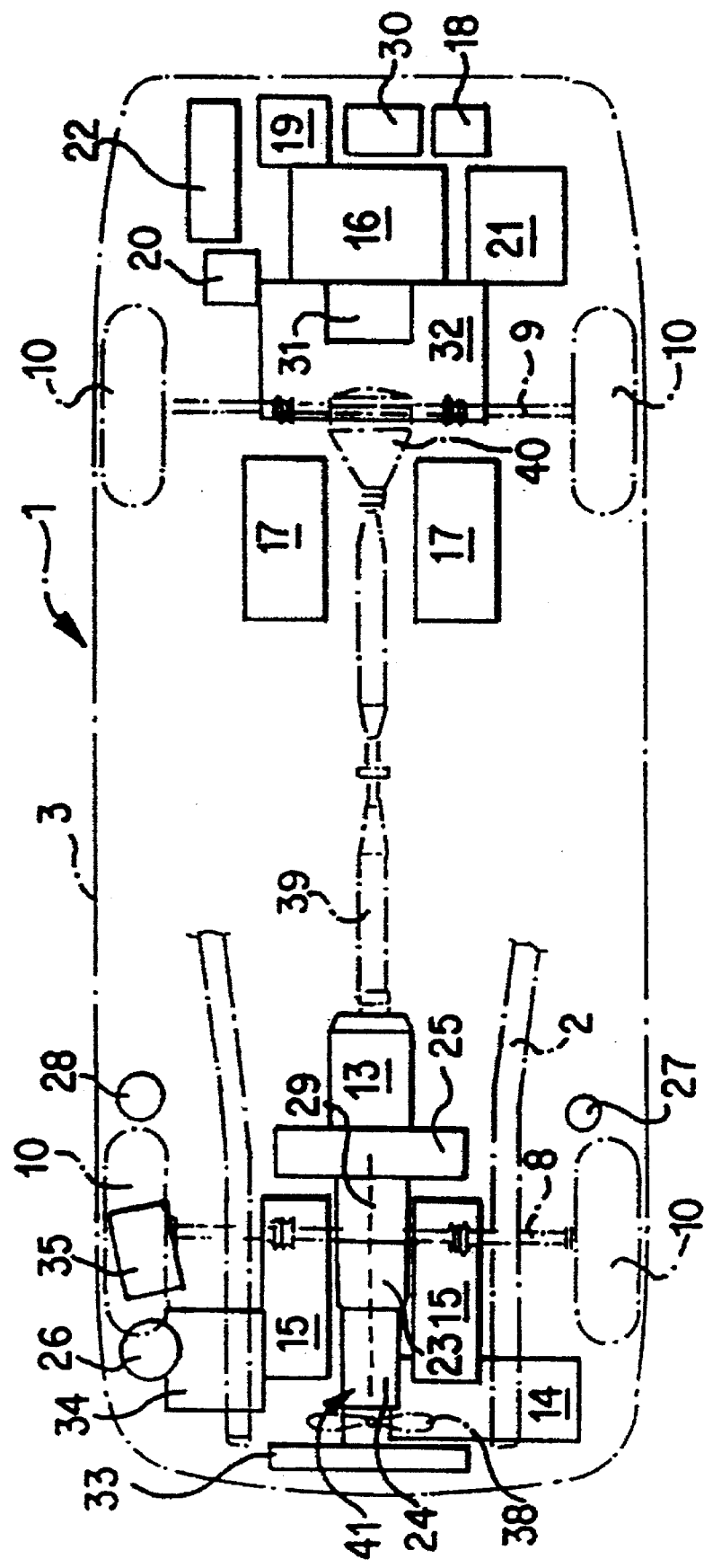
FIG. 1c shows another embodiment of the invention.

Provided in the front region of the vehicle are the fuel-cell radiator 33 and current-control units The arrangement of the radiator 33 in its known installation position ensures an adequate supply of cooling air. In this arrangement, a compact unit comprising bifurcated fuel-cell stack 15 and compressor 23 with associated electric motor 24 is additionally installed in the front section of the vehicle. A radiator fan 38 and the compressor 23 with electric motor 24 are fitted on a common shaft 41 which extends along the longitudinal axis of the vehicle. Further auxiliary units, for example the water pump 29, may also be mounted on said shaft, as shown in FIG. 1c. As noted previously, the fuel-cell stack 15 is partitioned into two parts which are situated on both sides of the compressor 23. As a result, a compact system can be implemented which has a short air duct from the air filter 26 to the fuel-cell stack 15 via the compressor 23. The distribution of the components over the front and rear sections of the vehicle 1 also helps to equalize the weight distribution and consequently to optimize the center of gravity.

In the case of a fuel-cell system without reformer 16, the fuel tank or tanks 17 may also be fitted in the region of the vehicle roof or in the boot.

Although the invention has been described and illustrated in detail, it is to be clearly understood that the same is by way of illustration and example, and is not to be taken byway of limitation. The spirit and scope of the present invention are to be limited only by the terms of the appended claims.

What is claimed is:

1. Arrangement of a drive unit in a vehicle, which drive unit comprises at least an electric traction motor coupled to receive electric power from a fuel cell, a compressor connected to the fuel cell to supply air thereto and an electric compressor motor connected to the compressor, wherein:

the compressor and the electric compressor motor are arranged in a front region of the vehicle;

the fuel cell is partitioned into at least two stacks, which are on opposite sides of the compressor;

a fuel-cell radiator, having a fuel cell radiator fan, is coupled in thermal communication with the fuel cell; and the radiator fan, the electric compressor motor and the compressor are mounted on a common drive shaft.

2. Arrangement according to claim 1 wherein a water pump is additionally mounted on the common drive shaft.

* * * * *